Patented Aug. 28, 1923.

1,466,213

UNITED STATES PATENT OFFICE.

PAUL TEETOR, OF LAWRENCE, KANSAS, ASSIGNOR TO THE JEFFERY-DEWITT COMPANY, OF DETROIT, MICHIGAN, A CORPORATION OF MAINE.

SURFACING MATERIAL FOR REFRACTORY WARE.

No Drawing.  Application filed April 8, 1921.  Serial No. 459,775.

*To all whom it may concern:*

Be it known that I, PAUL TEETOR, a citizen of the United States, and a resident of Lawrence, in the county of Douglas and State of Kansas, have made an Invention Appertaining to Surfacing Materials for Refractory Ware; and I do hereby declare the following to be a full, clear, and exact description of the invention, such as will enable others skilled in the art to which it appertains to make and use the same.

My invention has for its object to provide a surfacing material for refractory bodies such as saggars, cranks, linings, and kiln furniture generally, that are used in kilns and furnaces for supporting or containing ceramic ware while being fired. The coating containing my invention prevents deleterious effects on the ceramic ware when the ceramic ware is in contact with the refractory bodies, or within the refractory bodies, or fired in the presence of the refractory bodies.

When ceramic ware is in contact with, or contained within the refractory bodies as in the case of saggars, etc., or in the presence of the refractory bodies when fired, the glaze covering the ceramic ware will not be dulled or injured or discolored, if the refractory bodies contain injurious ingredients that liquefy, vaporize or gasify. The decomposition of the materials of the refractory bodies, or the liquefication and gasification, commonly occurs by reason of the low grade clays used, or by reason of the fluxes used, or by reason of characteristics of the refractory material itself. These deleterious conditions develop and increase by reason of the repeated high temperature changes to which the refractory bodies are subjected.

The protective coating embodying my invention will prevent the escape of any destructive or injurious liquids or gases that may develop within the refractory bodies, or at or near the surface of the refractory bodies, since the protective coating will render the refractory bodies substantially gas tight so that ceramic ware may be fired within or in the presence of such refractory bodies without destruction or injury of the glaze of the ceramic ware. Also the protective coating may be formed so that the gases that volatilize from the glaze of the ceramic bodies during firing, may not be absorbed by the refractory bodies if the ware is located in the refractory bodies, and thus the ceramic ware will be maintained in an atmosphere that will be beneficial to glaze formation and will improve the glaze appearance.

The protective material is of such a character that it will not volatilize, and will prevent sticking of unglazed ceramic ware to the refractory bodies, and also will prevent sticking of refractory bodies that are placed in contact with one another, as when saggars are super-imposed.

The invention has its particular value when used in connection with refractory bodies formed of bonded particles of silicon carbide, particularly if the amount of the clay binder does not cover all of the particles of the silicon carbide, or, particularly, if the refractory silicon carbide is formed of a relatively large proportion of fines. This is also true if a clay binder, maturing at a low temperature, is used, even though it is used in sufficient quantity to cover the particles of silicon carbide. The silicon carbide will decompose when it is subjected to a high temperature, and form a discolorizing liquid which develops at the surface of the refractory bodies in the form of blisters. These give off a vapor or gas which discolor the glaze of ceramic bodies and thus injure or destroy the ceramic bodies that may be fired in the presence of the refractory bodies. If the ceramic ware is in contact with or is contained within the refractory bodies the injurious effect is increased. The surfacing material embodying my invention will prevent the carborundum from decomposing, and prevent the ingredients thereof from boiling out, notwithstanding the high temperature of the furnace to which the ceramic ware and the refractory bodies may be subjected. The coating is formed of materials that will be viscous at higher temperatures, but not so viscous as to cause sticking at a high temperature, but a temperature relatively lower than the melting point of the surfacing material.

The surfacing material or coating may be formed of various combinations of sillimanite forming materials such as clay, alumina, etc. An example of the composition of the surfacing material is shown in the following table, wherein the percentages are given by weight:

| | |
|---|---|
| Ball clays | 16.6% |
| Kaolin | 66.8% |
| Alumina | 16.6% |
| | 100.0 |

Various changes in the composition may be made such as:

| | |
|---|---|
| Ball clays | 10% to 20% |
| Kaolin | 10% to 60% |
| Alumina | 15% to 85% |

The materials are ground together so as to pass through at least a twenty mesh screen, and suspended in a suitable medium, preferably water, so as to form a creamy slip. The material is applied to the refractory bodies by painting with a brush, spraying, or dipping the refractory bodies into the liquid wash. The coated refractory bodies are then fired at cone 11 or higher, when the material forms a vitreous or porous coating on the refractory bodies depending on the ingredients of the composition used. This is altered according to whether the ceramic ware is to be placed in contact with the refractory bodies, the temperature to which the ware and the bodies are to be subjected, and the viscosity or lack of it to be produced at the said temperature. Preferably the coating should have a fusion point exceeding cone 18.

If the composition is as given in the example, and if the temperature of the kiln is raised sufficiently, the material will form a coating of sillimanite over the surface of the refractory bodies. If desired, an organic binder may be incorporated in the wash to cause the adherence to the refractory bodies until they have been fired. Also if desired fluxes may be added, but not exceeding 2%.

The refractory bodies are thus made gas tight, which prevents injurious gases escaping from the refractory bodies. If the refractory bodies are in the form of containers, the surfacing material of the refractory bodies retains the useful glaze gases arising from the ceramic ware located in the containers, and thus prevents the escape of volatile ingredients of the glaze of the ceramic ware. This confines the ceramic ware in the atmosphere of the volatile ingredients and increases the brilliancy of the glaze formed on the ceramic bodies.

I claim:

1. A refractory article for use in firing ceramic ware to prevent discolorization thereof, comprising a body containing silicon carbide, and a protective coating free from silicon carbide formed thereon.

2. A refractory article for use in firing ceramic ware to prevent discolorization thereof, comprising a body containing silicon carbide, and a protective coating free from silicon carbide, and comprising a refractory protective coating.

3. A refractory article for use in firing ceramic ware to prevent discolorization thereof, comprising a body containing silicon carbide, and a protective coating free from silicon carbide applied thereto, and comprising a refractory glaze having a high viscosity.

4. A refractory article, the body of which contains silicon carbide, having a surface coating free from silicon carbide and comprising a refractory glaze.

5. A refractory article, the body of which contains silicon carbide, having a coating free from silicon carbide, and comprising a glaze having refractory properties preventing superficial dissociation of the silicon carbide.

6. A refractory article, the body of which contains silicon carbide, having a coating free from silicon carbide, and comprising a refractory coating having a low alkali content.

7. A refractory body having a glazed coating for preventing the escape of materials of which the refractory ware is comprised.

8. A refractory body for supporting ceramic ware having a protecting coating for preventing adherence of ceramic bodies to the refractory ware when subjected to a high temperature.

9. A refractory body used in firing ceramic ware, the refractory bodies containing silicon carbide, and having a glazed coating that vitrifies at a temperature above that at which the ceramic ware is fired.

10. A refractory article, the body of which contains silicon carbide, and having a coating free from silicon carbide and comprising refractory glaze with a fusion point exceeding cone 18.

11. A refractory article, the body of which contains silicon carbide, and having a coating free from silicon carbide and comprising a refractory glaze containing not to exceed 2% of fluxing constituents.

12. A refractory body formed of ingredients that will disintegrate at relatively low temperatures and to be used in connection with firing ceramic ware at relatively high temperatures, and having a glazed coating that will vitrify at relatively high temperatures.

13. A refractory body formed of ingredients that will disintegrate at relatively low temperatures and to be used in connection with firing ceramic ware at relatively high temperatures, and having a coating containing sillimanite.

14. A refractory body having ingredients that volatilize at a relatively low temperature, and a coating containing a sillimanite forming composition.

15. A refractory body used in firing ceramic ware, and having a vitrified coating for preventing the absorption of volatilizable ingredients of the glaze of ceramic bodies.

16. A refractory body used in firing ceramic ware, and having a coating containing a sillimanite forming composition for preventing the absorption of volatilizable ingredients of the glaze of ceramic bodies.

17. A refractory body used in firing ceramic ware, and having a vitrified coating containing a sillimanite forming composition for preventing the absorption of volatilizable ingredients of the glaze of ceramic bodies.

In testimony whereof, I have hereunto signed my name to this specification.

PAUL TEETOR.